(12) United States Patent
Nagayama et al.

(10) Patent No.: US 9,998,405 B2
(45) Date of Patent: Jun. 12, 2018

(54) PACKET RECEPTION APPARATUS

(71) Applicant: NTT Electronics Corporation, Yokohama-shi, Kanagawa (JP)

(72) Inventors: Hidenori Nagayama, Kanagawa (JP); Hiromi Fujita, Kanagawa (JP); Hidetoshi Suzuki, Kanagawa (JP)

(73) Assignee: NTT ELECTRONICS CORPORATION, Yokohama (JP)

( * ) Notice: Subject to any disclaimer, the term of this patent is extended or adjusted under 35 U.S.C. 154(b) by 0 days. days.

(21) Appl. No.: 15/116,766

(22) PCT Filed: Nov. 25, 2014

(86) PCT No.: PCT/JP2014/081122
§ 371 (c)(1),
(2) Date: Aug. 4, 2016

(87) PCT Pub. No.: WO2015/133020
PCT Pub. Date: Sep. 11, 2015

(65) Prior Publication Data
US 2017/0019352 A1    Jan. 19, 2017

(30) Foreign Application Priority Data
Mar. 7, 2014    (JP) ................................. 2014-045444

(51) Int. Cl.
*H04L 12/939*    (2013.01)
*H04L 12/64*    (2006.01)
(Continued)

(52) U.S. Cl.
CPC ........ *H04L 49/552* (2013.01); *H04L 12/6418* (2013.01); *H04L 49/901* (2013.01); *H04L 49/9042* (2013.01)

(58) Field of Classification Search
CPC ....................................... H04L 47/50–47/6295
See application file for complete search history.

(56) References Cited

U.S. PATENT DOCUMENTS 7,933,283 B1 *    4/2011    Liu .................... H04L 47/6215
370/412
2008/0279181 A1    11/2008    Shake et al.
(Continued)

FOREIGN PATENT DOCUMENTS

JP    2007-209040 A    8/2007
JP    4068545 B2    1/2008
(Continued)

OTHER PUBLICATIONS

Japanese Office Action dated Feb. 17, 2015 for Japanese Patent Application No. 2014-045444, with partial English Translation.
(Continued)

*Primary Examiner* — Pao Sinkantarakorn
(74) *Attorney, Agent, or Firm* — Arent Fox LLP

(57) ABSTRACT

A reception buffer of a packet reception apparatus includes a plurality of storage addresses. A packet determination unit receives a packet from a plurality of lines including a main system and an auxiliary system. The packet determination unit obtains a storage address corresponding to a unique number assigned to the packet, and overwrites and stores data of the packet onto the storage address. A packet extraction/transmission unit extracts and transmits the data stored in the reception buffer.

4 Claims, 2 Drawing Sheets

(51) Int. Cl.
    *H04L 12/879*     (2013.01)
    *H04L 12/861*     (2013.01)

(56) References Cited

U.S. PATENT DOCUMENTS

2008/0304488 A1    12/2008    Naito et al.
2015/0026542 A1*    1/2015    Brennum .............. H04L 47/625
                                                                                                            370/392

FOREIGN PATENT DOCUMENTS

| JP | 2009-516478 A | 4/2009 |
| --- | --- | --- |
| JP | 2011-035516 A | 2/2011 |
| JP | 4864029 B2 | 11/2011 |
| WO | WO 2007/120209 A2 | 10/2007 |

OTHER PUBLICATIONS

Japanese Office Action dated Jun. 2, 2015 for Japanese Patent Application No. 2014-045444, with partial English Translation.
International Preliminary Report on Patentability dated Sep. 22, 2016 for International Patent Application No. PCT/JP2014/081122, English Translation.

* cited by examiner

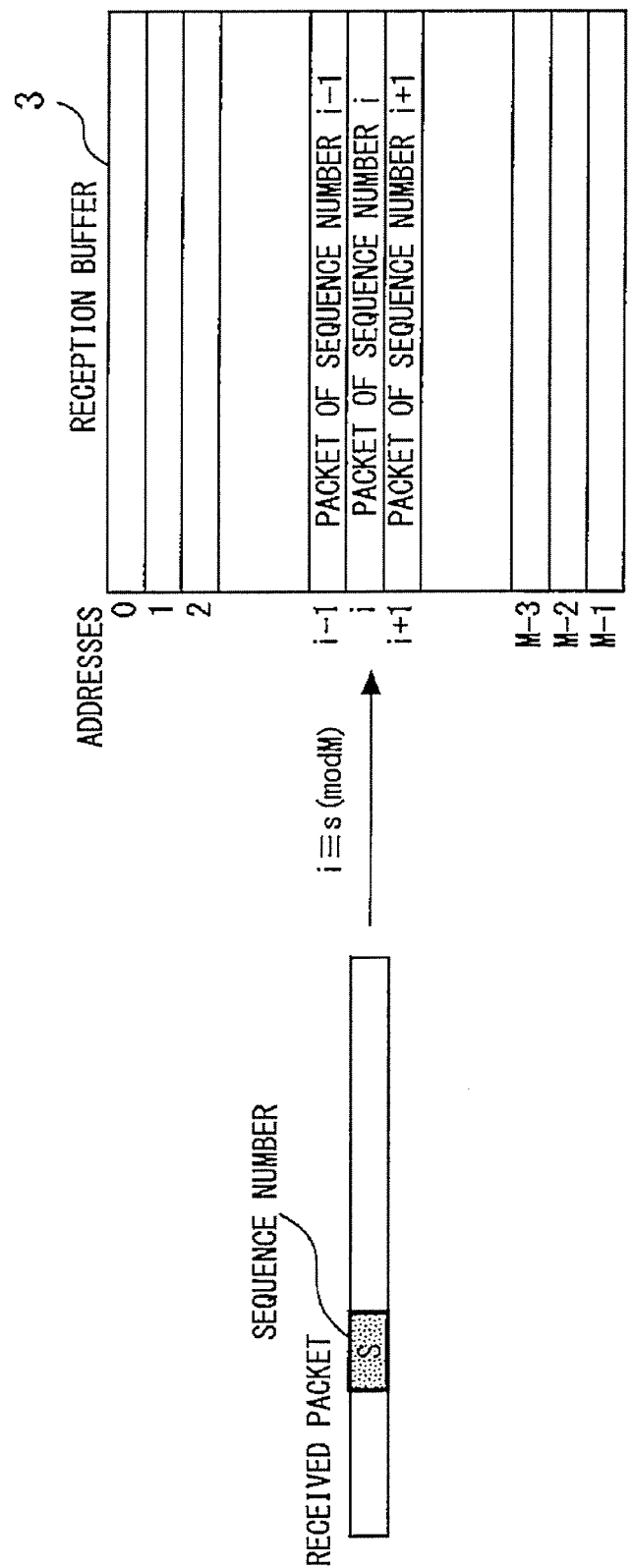

PACKET RECEPTION APPARATUS

CROSS-REFERENCE TO RELATED APPLICATIONS

This application is a National Stage entry of International Application No. PCT/JP2014/081122 filed Nov. 25, 2014, which claims the benefit of Priority of Japanese Application No. 2014-045444 filed Mar. 7, 2014, the disclosure of these prior applications are hereby incorporated in their entirety by reference.

FIELD

The present invention relates to a packet reception apparatus of a packet transmission system utilizing an IP (Internet Protocol) network, and this packet reception apparatus is used in a video transmission system or the like of a surveillance system, an indoor community system, a digital signage system, or a public viewing system, for example.

BACKGROUND

There are packet reception apparatuses that improve the packet loss recovery rate by incorporating redundant systems in order to improve the reliability of the packet transmission. This type of conventional packet reception apparatus usually acquires a data sequence of a "main system (also referred to as a 0 system)" and, if there is packet loss, acquires necessary packets from a data sequence of a separate "auxiliary system (also referred to as a 1 system)" to create an overall data sequence without loss (see PTL 1, for example).

CITATION LIST

Patent Literature

[PTL 1]Japanese Patent No. 4854029

SUMMARY

Technical Problem

However, there is a problem that in order to process the data sequences of two or more systems with a conventional packet reception apparatus, the size of the processing system becomes large.

The present invention aims to solve the problems described above, and to provide a packet reception apparatus that can easily realize high reliability for packet transmission utilizing a network.

Solution to Problem

A packet reception apparatus according to the present invention includes: a reception buffer including a plurality of storage addresses; a packet determination unit receiving a packet from a plurality of lines including a main system and an auxiliary system, obtaining a storage address corresponding to a unique number assigned to the packet, and overwriting a data of the packet onto the storage address; and a packet extraction/transmission unit extracting and transmitting the data stored in the reception buffer.

Advantageous Effects of Invention

The present invention makes it possible to easily realize high reliability for packet transmission utilizing a network.

BRIEF DESCRIPTION OF THE DRAWINGS

FIG. 2 is a drawing showing storage addresses of received packets.

DESCRIPTION OF EMBODIMENTS

Figure 1:
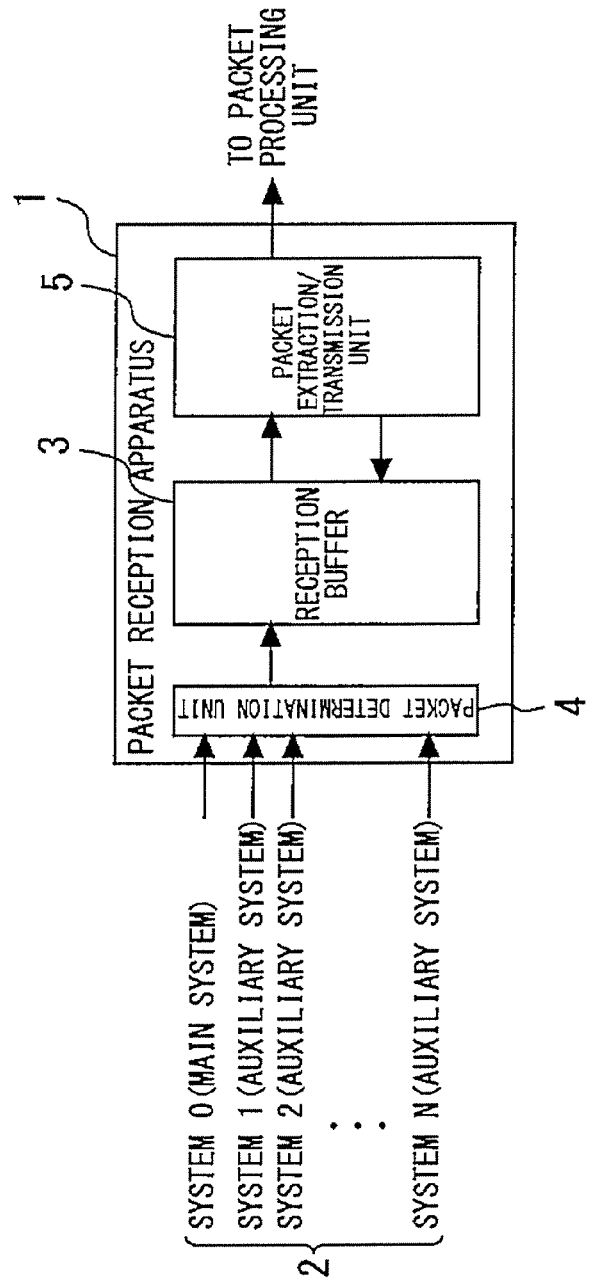
FIG. 1 is a block diagram showing a packet reception apparatus according to an embodiment of the present invention.

FIG. 1 is a block diagram showing a packet reception apparatus according to an embodiment of the present invention. A plurality of lines 2 including a main system (0 system) and auxiliary systems (1 systems) are connected to a packet reception apparatus 1. The packet reception apparatus 1 is provided with a reception buffer 3. In this reception buffer 3, a plurality of storage addresses are prepared in advance as storage locations for respective packets. A packet determination unit 4 includes a number of interfaces corresponding to the number of the plurality of lines 2, and receives packets from the plurality of lines 2.

The packet determination unit 4 obtains a storage address corresponding to a unique number assigned to a packet. FIG. 2 is a drawing showing storage addresses of received packets. Here, the unique numbers assigned to the packets are sequence numbers within RTP packets. Accordingly, the packet determination unit 4 acquires the sequence numbers in the RTP packets contained in the received packets from the main system and the auxiliary systems, and calculates storage addresses of the reception buffer 3 from these sequence numbers. Then, regardless of the packet reception system, the packets are stored in the reception buffer 3 in order of the sequence numbers every time a packet arrives.

When the acquired sequence number is s, the storage address i for this packet is obtained as an i that satisfies i=s(modM). Here, i is a natural number greater than or equal to 0 and less than or equal to M−1, and is a storage address of the reception buffer 3. M is the maximum number of packets that can be stored in the reception buffer 3. As shown in FIG. 2, addresses of the reception buffer 3 are assigned from 0 to M−1. The actual value of M is determined in consideration of the arrival delay difference of identical packets among all systems connected to the packet reception apparatus 1. The packets are stored in order of the sequence numbers in the reception buffer 3.

The packet determination unit 4 is completely unaware of what kind of packets are already stored at what storage addresses, and overwrites the data of the packets onto the storage addresses. In other words, after acquiring the data sequence of the main system (0 system), the packet determination unit 4 acquires the data sequences of the auxiliary systems (1 systems) regardless of whether packet loss occurs for the main system. In this way, it is possible to store the correct packets as long as loss does not occur in both systems.

The transmission delay difference between systems is compensated for by adjusting the accumulation amount in the reception buffer 3. Since there is no need to secure a packet accumulation memory for each system, the memory usage amount is constant regardless of the number of systems.

A packet extraction/transmission unit 5 extracts the data stored in the reception buffer 3 in order beginning with number 0, and transmits packets via an output system to a packet processing unit that is downstream. When this occurs, 0 (NULL) is overwritten onto the storage address of the reception buffer 3 from which the data was extracted (0 overwrite, 0 clear). Furthermore, when the data extracted from the reception buffer 3 is NULL, it is judged that this packet has been lost for both the main system and the auxiliary systems, and this data is not transmitted in a packet. At the time when the packet reception apparatus 1 begins operating, the initial values in the reception buffer 3 are all 0 (NULL).

In the present embodiment, packets are received from the plurality of lines 2 including the main system and auxiliary systems, the storage addresses of the reception buffer 3 corresponding to the unique numbers assigned to the packets are obtained, and the data of the packets is overwritten onto these storage addresses to be stored. Therefore, even when loss occurs among packets received from the main system, it is possible to recover this loss with the packets received from the auxiliary system. Accordingly, there is no need to save a packet history for packets that have already been passed or processed in order to pass or block packets. Furthermore, the size of the processing system does not increase when the number of systems including the main system and auxiliary systems increases. As a result, it is possible to easily realize high reliability for packet transmission utilizing a network.

The present embodiment describes an example of packet reception physically from a plurality of systems, which are the one main system and the N auxiliary systems, but the same effect can be realized when receiving data of a main system and auxiliary systems physically from one system. Furthermore, the same effect can be realized in a case where transmission is performed while allocating the packets themselves of the main system to a plurality of lines according to limitations on the capacities of the lines or a case where lines of auxiliary systems are added.

In a case where a large amount of data is transmitted as packets, it is possible to perform transmission efficiently by dividing the transmission among a plurality of systems instead of transmitting with one system. However, significant packet reordering occurs due to the transmission delay difference between systems. With the present embodiment, it is possible to correct the order that was altered by such packet reordering when overwriting onto the reception buffer 3.

The present embodiment uses the sequence numbers in the RTP packets as the unique numbers assigned to the packets, but sequence numbers in other layers may be used. Furthermore, in the present embodiment, NULL is overwritten onto the storage addresses of the reception buffer 3 from which data has been extracted, but the present invention is not limited to this, and any value may be written as long as the value can be understood as indicating that reading has occurred and absolutely does not appear as a value (symbol) in the packets.

REFERENCE SIGNS LIST

1 packet reception apparatus; 2 line; 3 reception buffer; 4 packet determination unit; 5 packet extraction/transmission unit

The invention claimed is:
1. A packet reception apparatus comprising:
a reception buffer including a plurality of storage addresses;
a packet receiver configured to receive a packet from a plurality of lines including a main system and an auxiliary system, obtain a storage address of the reception buffer corresponding to a unique number assigned to the packet, and overwrite a data of the packet onto the storage address; and
a packet transmitter configured to extract from the storage address and transmit the data stored in the reception buffer,
wherein NULL is overwritten onto the storage address of the reception buffer from which the data was extracted by the packet transmitter, and
wherein the packet transmitter does not transmit the data when the data extracted from the storage address of the reception buffer is NULL.

2. The packet reception apparatus of claim 1, wherein the unique number assigned to the packet is a sequence number within a RTP packet.

3. A packet reception apparatus comprising:
a reception buffer including a plurality of storage addresses,
wherein the packet reception apparatus is configured to receive a packet from a plurality of lines including a main system and an auxiliary system, obtain a storage address of the reception buffer corresponding to a unique number assigned to the packet, and overwrite a data of the packet onto the storage address, and
wherein the packet reception apparatus is configured to extract from the storage address and transmit the data stored in the reception buffer,
wherein NULL is overwritten to the storage address of the reception buffer upon the data being extracted and transmitted by the packet reception apparatus, and
wherein, when the data extracted from the storage address is NULL, the data is not transmitted by the packet reception apparatus.

4. The packet reception apparatus of claim 3, wherein the unique number assigned to the packet is a sequence number within a RTP packet.

* * * * *